(12) United States Patent
Kelly et al.

(10) Patent No.: US 12,237,525 B2
(45) Date of Patent: Feb. 25, 2025

(54) BATTERY OR ELECTROCHEMICAL CELL FIXTURE

(71) Applicant: Solid Power, Inc., Louisville, CO (US)

(72) Inventors: Brandon Kelly, Longmont, CO (US); Alex Hinesley, Denver, CO (US); Ilya Lisenker, Boulder, CO (US); Uday Kasavajjula, Superior, CO (US); Khay Taherkhani, Longmont, CO (US)

(73) Assignee: Solid Power Operating, Inc., Louisville, CO (US)

( * ) Notice: Subject to any disclaimer, the term of this patent is extended or adjusted under 35 U.S.C. 154(b) by 214 days.

(21) Appl. No.: 17/448,009

(22) Filed: Sep. 17, 2021

(65) Prior Publication Data

US 2022/0094009 A1   Mar. 24, 2022

Related U.S. Application Data

(60) Provisional application No. 63/080,312, filed on Sep. 18, 2020.

(51) Int. Cl.
  *H01M 50/262* (2021.01)
  *H01M 10/48* (2006.01)
  (Continued)

(52) U.S. Cl.
  CPC ......... *H01M 50/262* (2021.01); *H01M 10/48* (2013.01); *H01M 50/209* (2021.01); *H01M 50/211* (2021.01); *H01M 50/60* (2021.01)

(58) Field of Classification Search
  CPC ............. H01M 50/262; H01M 50/211; H01M 10/0486; H01M 50/164; H01M 50/202; H01M 50/289
  See application file for complete search history.

(56) References Cited

U.S. PATENT DOCUMENTS

| 4,209,479 A | 6/1980 | Gunther et al. |
| 8,603,665 B2 | 12/2013 | Moon et al. |

(Continued)

FOREIGN PATENT DOCUMENTS

| CN | 103794741 A | 5/2014 |
| CN | 109742270 A | 8/2022 |

(Continued)

OTHER PUBLICATIONS

International Searching Authority, International Search Report and Written Opinion, issued for International Application No. PCT/US2021/050865, Dec. 20, 2021.

*Primary Examiner* — Maria Laios
*Assistant Examiner* — Jordan E Berresford
(74) *Attorney, Agent, or Firm* — Polsinelli PC; Gregory P. Durbin

(57) ABSTRACT

A device for applying compressive force to electrochemical cells or batteries with superior pressure distribution, which includes first and second external plates; a first internal plate positionable adjacent to the first external plate, and comprising an external dimension corresponding to an external dimension of the first external plate and an internal dimension defining a first aperture corresponding to the exterior dimensions of an electrochemical cell or battery; a second internal plate positionable adjacent to the second external plate, and comprising external dimension corresponding to an external dimension of the second external plate and an internal dimension defining a second aperture corresponding to the exterior dimensions of the electrochemical cell or battery; and a plurality of fasteners configured to extend through the first and second external plates and the first and second internal plates to apply pressure to the electrochemical cell or battery positioned between the first and second internal plates.

20 Claims, 3 Drawing Sheets

(51) Int. Cl.
  *H01M 50/209* (2021.01)
  *H01M 50/211* (2021.01)
  *H01M 50/60* (2021.01)

(56) References Cited

U.S. PATENT DOCUMENTS

| | | | |
|---|---|---|---|
| 10,270,069 B2 | 4/2019 | Jo et al. | |
| 10,581,041 B2 | 3/2020 | Wiles et al. | |
| 10,763,460 B2 | 9/2020 | Jung | |
| 10,950,832 B2 | 3/2021 | Kawakami et al. | |
| 11,139,541 B2 | 10/2021 | Schoenherr | |
| 11,309,544 B2 | 4/2022 | Sahin et al. | |
| 11,831,027 B2 | 11/2023 | Slagle et al. | |
| 2010/0255351 A1* | 10/2010 | Ijaz | H01M 50/553 429/7 |
| 2011/0177377 A1 | 7/2011 | Dube | |
| 2012/0208054 A1 | 8/2012 | Shirasawa et al. | |
| 2014/0377554 A1* | 12/2014 | Cho | C09J 11/04 524/321 |
| 2015/0037662 A1* | 2/2015 | Pinon | H01M 50/105 29/623.2 |
| 2015/0194697 A1 | 7/2015 | Hung et al. | |
| 2018/0309175 A1* | 10/2018 | Chorian | H01M 10/6555 |
| 2020/0280109 A1 | 9/2020 | Nam et al. | |
| 2021/0305640 A1* | 9/2021 | Takeda | H01M 10/6555 |
| 2021/0384527 A1 | 12/2021 | Greszler et al. | |
| 2022/0094009 A1 | 3/2022 | Kelly et al. | |
| 2022/0158295 A1 | 5/2022 | Kotik et al. | |
| 2022/0255170 A1 | 8/2022 | Kotik et al. | |
| 2022/0271326 A1 | 8/2022 | Kaufmann et al. | |
| 2023/0115565 A1 | 4/2023 | Muelberger | |
| 2023/0238672 A1 | 7/2023 | Bai et al. | |

FOREIGN PATENT DOCUMENTS

| | | | | |
|---|---|---|---|---|
| DE | 102011077061 A1 | 12/2012 | | |
| DE | 102016009394 A1 | 12/2017 | | |
| DE | 102017212449 A1 | 1/2019 | | |
| DE | 102019004928 A1 | 1/2021 | | |
| DE | 102020108136 B3 | 6/2021 | | |
| JP | H06-231794 A | 8/1994 | | |
| JP | 4892897 B2 | 3/2012 | | |
| JP | 5594264 B2 | 9/2014 | | |
| JP | 2015022817 A | 2/2015 | | |
| JP | 2018063865 A | 4/2018 | | |
| JP | 3886202 A1 | 9/2021 | | |
| JP | 7272788 B2 | 5/2023 | | |
| KR | 20060060800 A | 6/2006 | | |
| WO | WO 2016-045855 A1 | 3/2016 | | |
| WO | WO-2016103943 A1 * | 6/2016 | | H01M 2/02 |
| WO | WO 2019-017994 A1 | 1/2019 | | |

* cited by examiner

BATTERY OR ELECTROCHEMICAL CELL FIXTURE

CROSS-REFERENCE TO RELATED APPLICATIONS

This application claims priority to U.S. Patent Application Ser. No. 63/080,312, filed Sep. 18, 2020, the contents of which are incorporated herein by reference in its entirety.

FIELD

Various embodiments described herein relate to the field of devices for applying pressure to primary and secondary electrochemical cells and batteries in their production processes.

BACKGROUND OF THE INVENTION

In the world of batteries, few have become more widespread as the rechargeable Lithium-Ion battery, which now powers our phones, laptops, and electronic devices. In general, these batteries contain a negative electrode in the form of a hard oxide material, a positive electrode in the form of carbon, such as graphite, and a liquid electrolyte. These batteries operate by shuttling lithium ions back and forth between the positive electrode and the negative electrode by means of the liquid electrolyte. Which way the lithium ions flow depends on whether the battery is charging or discharging. This is all made possible by the liquid electrolyte making electrical contact with both the negative and positive electrodes. With the use of liquid electrolytes, little to no external pressure is required to maintain electrical contact of the liquid electrolyte with the electrodes. However, as these batteries began to be implemented to power automobiles, new designs and features of these batteries became necessary. To meet this need, a new type of battery was created—the All-Solid-State Battery (ASSB).

In this new battery, the liquid electrolyte was replaced with a new solid electrolyte, which allows for the use of new high energy dense negative electrodes, mainly Lithium metal and Silicon metal. Because of these new features, ASSBs can be safer and have superior performance to standard lithium ion batteries. However, with these changes also comes challenges, and one of the largest challenges stems from the difference in the interfacial behavior of a solid electrolyte-lithium metal electrode system, as compared to a liquid electrolyte-graphite electrode system.

In a liquid electrolyte-graphite electrode system, when lithium ions move into the graphite negative electrode, a process called intercalation, the graphite expands and then contracts as the lithium ions are removed from the graphite. As this graphite electrode expands and contacts, the liquid electrolyte effortlessly flows with the graphite maintaining optimal interfacial contact.

In a solid electrolyte-lithium metal electrode system however, the intercalation process is replaced by a platting/stripping mechanism where lithium ions convert to lithium metal at the surface of the lithium metal (plating) or lithium metal is converted into lithium ions and is pulled from the lithium metal surface (stripping). During platting, lithium can build up in specific areas and cause parts of the lithium metal electrode to peel away from the solid electrolyte surface. During stripping, the lithium metal in contact with the solid electrolyte is converted into lithium ions and pulled from the lithium metal surface. This process can happen unevenly creating voids where the lithium metal pulls away from the surface of the solid electrolyte. In both cases, as more contact between the lithium metal and the solid electrolyte is lost, the area-specific resistance at the interface increases, ultimately causing the electrochemical performance of the cell to falter. To overcome this challenge, it is imperative to have a compressive force evenly distributed across the entire surface of the cell in order to ensure optimal interfacial contact between a solid electrolyte and a high energy dense electrode, like lithium metal.

Currently, a number of battery packs and case assemblies are known (U.S. Pat. Nos. 8,603,665 and 10,763,460). However, the described battery packs and case assemblies suffer from a variety of deficiencies, which makes them unsuitable for the requirements of ASSBs. To meet the growing public need, this application discloses a novel device having the ability to add a compressive force to an electrochemical cell with superior pressure distribution across the entire surface of the cell in order to ensure optimal interfacial contact between a solid electrolyte and a high energy dense electrode.

SUMMARY OF THE INVENTION

This disclosure provides an electrochemical cell or battery pressure application device comprising first and second external plates; a first internal plate positionable adjacent to the first external plate, and comprising an external dimension corresponding to an external dimension of the first external plate and an internal dimension defining a first aperture corresponding to the exterior dimensions of an electrochemical cell or battery; a second internal plate positionable adjacent to the second external plate, and comprising external dimension corresponding to an external dimension of the second external plate and an internal dimension defining a second aperture corresponding to the exterior dimensions of the electrochemical cell or battery; and a plurality of fastener sets configured to extend through the first and second external plates and the first and second internal plates for applying pressure to the electrochemical cell or battery positioned between the first and second internal plates.

In one embodiment of the electrochemical cell or battery pressure application device, the first and second internal plates have the same external dimensions.

In another embodiment of the electrochemical cell or battery pressure application device, the respective apertures of the first and second internal plates have the same dimensions.

In yet another embodiment of the electrochemical cell or battery pressure application device, the first and second external plates have the same external dimensions.

In still another embodiment of the electrochemical cell or battery pressure application device, a thickness of the first and second external plates comprises approximately 0.075 to 0.4 inches.

In another embodiment of the electrochemical cell or battery pressure application device, a thickness of the first and second internal plates comprises approximately 0.05 to 0.300 inches.

In an alternative embodiment of the electrochemical cell or battery pressure application device, the first external plate and the first internal plate are integrally formed and the second external plate and the second internal plate are integrally formed.

In another embodiment of the electrochemical cell or battery pressure application device, the device also includes a first compliant layer positionable adjacent to the first internal plate, opposite the first external plate; and a second compliant layer positionable adjacent to the second internal plate, opposite the second external plate.

In yet another embodiment of the electrochemical cell or battery pressure application device, each of the first and second compliant layers are approximately 0.0078 to 0.25 inches thicker than the respective one of the first and second internal plates.

In still another embodiment of the electrochemical cell or battery pressure application device, the device also includes a first separator film on a surface of the first compliant layer opposite the first internal plate; and a second separator film on a surface of the second compliant layer opposite the second internal plate.

In another embodiment of the electrochemical cell or battery pressure application device, each of the first and second separator films comprises a polymer-based film.

In an alternative embodiment of the electrochemical cell or battery pressure application device, the device also includes a mold release spray coating on each of the first and second separator films opposite the respective one of the first and second compliant layers.

In another embodiment of the electrochemical cell or battery pressure application device, each of the first and second compliant layers is comprised of one or more materials selected from the group consisting of silicone rubbers, Viton rubbers, Buna-N, natural rubber, neoprene and polyurethane.

In still another embodiment of the electrochemical cell or battery pressure application device, each of the first and second compliant layers has a durometer in the range of Shore 10A to Shore 90A.

In yet another embodiment of the electrochemical cell or battery pressure application device, the first compliant layer comprises at least a first portion that is dimensioned to be received within the first aperture; and the second compliant layer comprises at least a first portion that is dimensioned to be received within the second aperture.

In another embodiment of the electrochemical cell or battery pressure application device, each of the first and second compliant layers further comprises a second portion having an exterior dimension that corresponds to the exterior dimension of the electrochemical cell or battery positioned between the first and second internal plates.

In still another embodiment of the electrochemical cell or battery pressure application device, each of the first and second compliant layers comprises a thicker center portion, aligning with an inner portion of the electrochemical cell or battery, and a thinner peripheral portion aligning with a peripheral portion of the electrochemical cell or battery.

In another embodiment of the electrochemical cell or battery pressure application device, the first compliant layer comprises a first membrane forming a first sealed volume and disposed within the aperture of the first internal plate; and the second compliant layer comprises a second membrane forming a second sealed volume and disposed within the aperture of the second internal plate.

In yet another embodiment of the electrochemical cell or battery pressure application device, the first and second external plates further comprise couplings in communication with a respective one of the first and second membranes for adjusting the pressure within the respective sealed volume.

In another embodiment of the electrochemical cell or battery pressure application device, the first and second external plates and first and second internal plates each have a plurality of mutually aligned apertures and wherein each of the fastener sets comprises a threaded fastener disposable with a respective one of the mutually aligned apertures, a threaded nut receivable by the threaded fastener, and at least one washer disposable intermediate the respective threaded fastener and the respective threaded nut.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION OF ILLUSTRATED EMBODIMENTS

In the following description, specific details are provided to impart a thorough understanding of the various embodiments of the disclosure. Upon having read and understood the specification, claims and drawings hereof, however, those skilled in the art will understand that some embodiments of the disclosure may be practiced without hewing to some of the specific details set forth herein. Moreover, to avoid obscuring the disclosure, some well-known methods, processes, devices, and systems finding application in the various embodiments described herein are not disclosed in detail.

Fixtures capable of applying various pressures to batteries and electrochemical cells during handling, storing, testing, using and performance evaluation are required for multiple types of batteries and cells, including prismatic cells and pouch cells, which utilize either of or both solid and/or liquid electrolyte materials. The application of uniform pressure is often required for maintaining Ohmic contact between components within a cell or battery throughout the entire life of a respective cell or battery. In the following discussion, "cell" will be used to refer to the object under pressure within the fixture, which may be a battery or an electrochemical cell. A battery including one or more electrochemical cells may also be used in place of any single cell.

Figure 1:
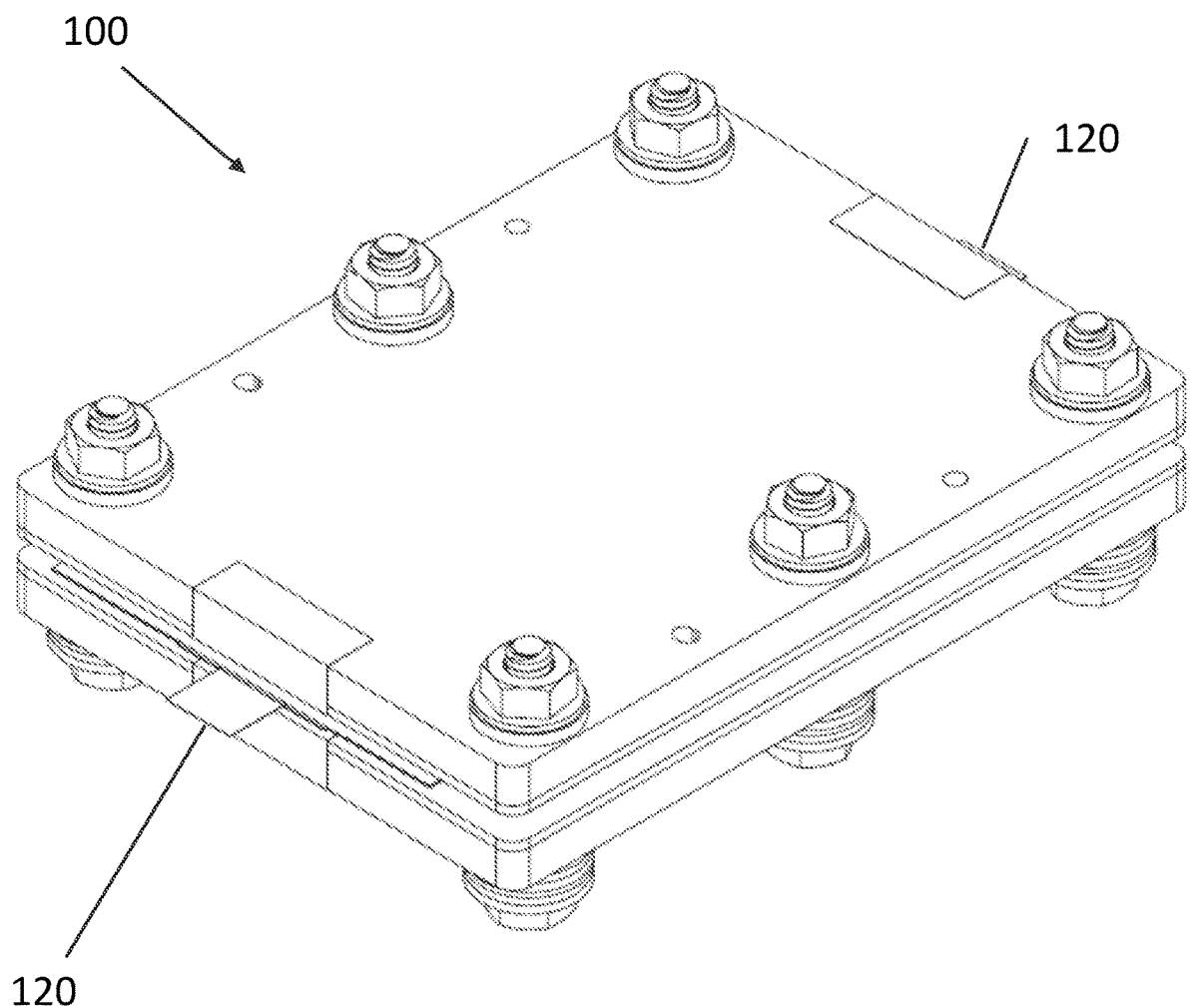
FIG. 1 is a three-dimensional drawing of an exemplary construction of a battery or electrochemical cell fixture, in accordance with an embodiment.

FIG. 1 is a three-dimensional drawing of an exemplary construction of a cell fixture 100. As shown, the cell fixture 100 fully encloses a cell (not shown) to maintain mechanical contact between the fixture and the components of the cell while leaving access available for cell tabs or terminals 120 that permit electrical contact to be made from external components to the cell. These external components may include respective interfaces that are mechanically configured for secure, selective engagement with the tabs or terminals and for conducting electrical current to and from the respective cell. Further, the external components may include a respective receiver for selectively and mechanically receiving the disclosed fixture with respective cell, the receiver having respective interfaces for electrically engaging the tabs or terminals.

Figure 2:
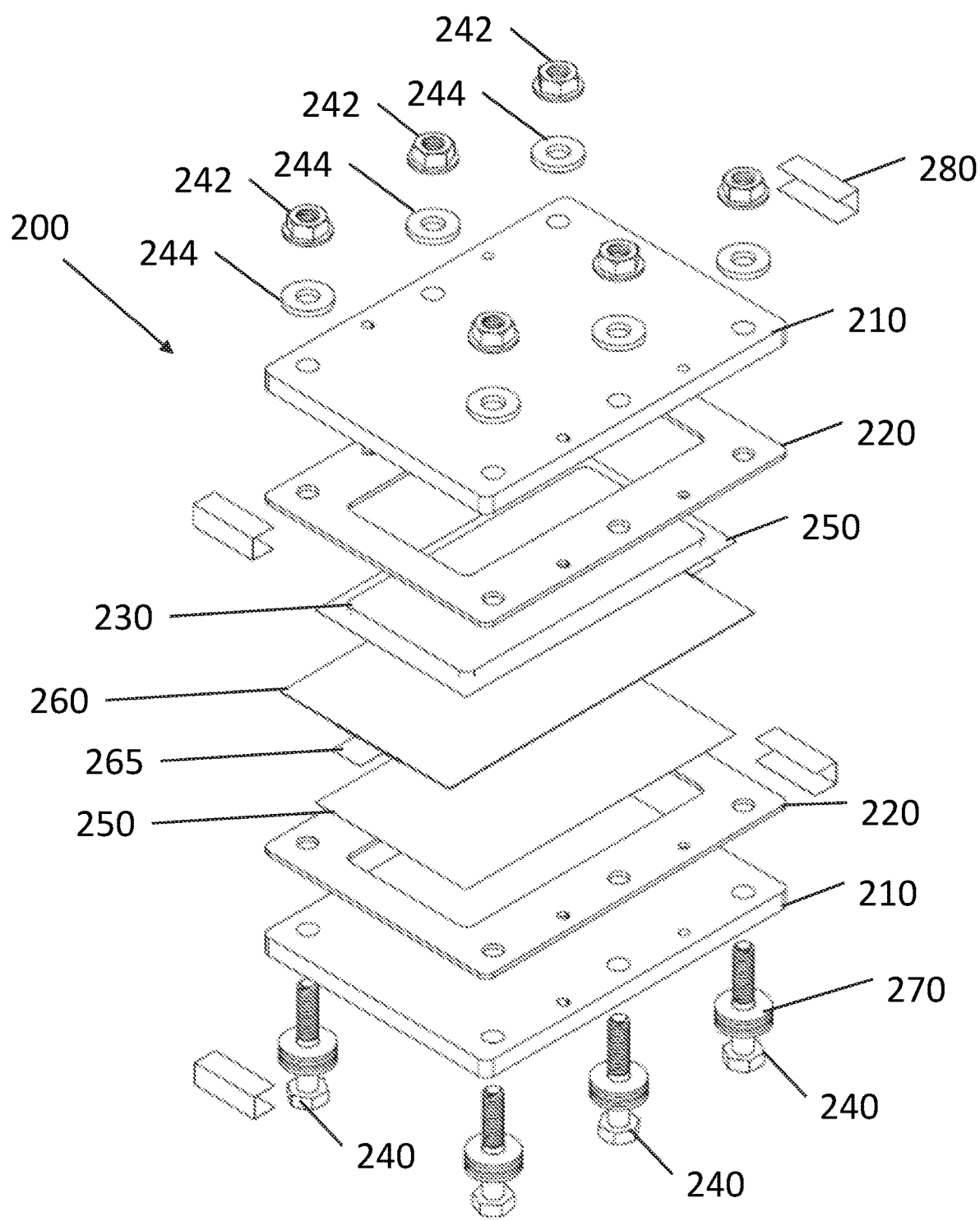
FIG. 2 is a three-dimensional exploded-view drawing of an exemplary construction of a battery or electrochemical cell fixture, in accordance with an embodiment.

FIG. 2 is a three-dimensional exploded-view drawing of an exemplary construction of a cell fixture 200 according to the present disclosure. Cell fixture 200 includes external plates 210, which may be used to align and constrain various related portions of cell fixture 200 and allow for distribution of applied loads to cell 260 received therein and undergoing testing, handling, use, or storage. External plates may be conveniently formed from one or more of a metal or metal alloy, plastic or polymer, ceramic, or fiber-containing material. In some embodiments, one or more of a metal alloy such as A36 low-carbon steel or aluminum alloy (6061-T6), Nickel, Copper, Tin, Titanium, Platinum, or Zinc may be used. In another embodiment, the external plates may be made of one or more plastics or binders, such as nylon, polycarbonate, high-density polyethylene, low-density polyethylene, polypropylene, polystyrene, polyvinyl chloride, and acrylonitrile butadiene styrene. In yet another embodiment, the external plates may be formed from one or more ceramics, such as Alumina, Zirconia, Silica, Aluminum Carbide, Zirconium Carbide, Silicon Carbide, Aluminum Nitride, Zirconium Nitride, Silicon Nitride, and Boron Nitride. In a further embodiment, the external plates may be formed from one or more of a fiber-containing material, such as fiberglass or carbon fiber. In yet another embodiment, the external plates may be formed from a material or composite suitable to support and distribute the required uniform pressures used to load the cell while maintaining appropriate flatness and rigidity. Material type and material thickness of external plates 210 can be modified to address the necessary testing, handling, or storing pressures required. Thicknesses of external plates 210 may be from approximately 0.075 inches to 1.000 inch. In other embodiments, the thickness of the external plates 210 may be 0.100 to 0.750 inches. In yet another embodiment, the thickness may be 0.115 inches to 0.500 inches. In yet a further embodiment, the thickness may be 0.125 to 0.250 inches. External plates 210 may be formed, machined, or pre-stressed to be deformed, e.g. non-flat, prior to having a load applied such that after the appropriate load is applied to cell 260, external plates 210 are converted to a shape, e.g., flat, which is appropriate for uniformly loading cell 260. For example, each external plate may have a central region that is slightly deflected, an upper external plate may have a central region that deflects downward, toward the cell entrained therein, and a lower external plate may have a central region that deflects upward, toward the cell entrained therein.

Positioned between external plates 210 are one or more internal plates 220, which may be modified to fit the shape/form of cell 260. For example, plates 220 include a rectangular aperture for receiving a rectangular cell 260 therein. For testing, handling, using, or storing of a complete battery, which may include multiple cells and which may present an overall greater thickness as compared to a single cell, internal plates 220 may be provided with greater degrees of thickness or additional plates may be added to the assembly of cell fixture 200. Similar to external plates 210, internal plates 220 may be conveniently formed from one or more of a metal or metal alloy, plastic or polymer, ceramic, or fiber-containing material. In some embodiments, one or more of a metal alloy such as A36 low-carbon steel or aluminum alloy (6061-T6), Nickel, Copper, Tin, Titanium, Platinum, or Zinc may be used. In another embodiment, the internal plates may be made of one or more plastics or binders, such as nylon, polycarbonate, high-density polyethylene, low-density polyethylene, polypropylene, polystyrene, polyvinyl chloride, and acrylonitrile butadiene styrene. In yet another embodiment, the internal plates may be formed from one or more ceramics, such as Alumina, Zirconia, Silica, Aluminum Carbide, Zirconium Carbide, Silicon Carbide, Aluminum Nitride, Zirconium Nitride, Silicon Nitride, or Boron Nitride. In a further embodiment, the internal plates may be formed from one or more of a fiber-containing material, such as fiberglass or carbon fiber. In yet another embodiment, the internal plates may be formed used a material suitable to support and distribute the required uniform pressures used to load the cell while maintaining appropriate flatness and rigidity. The choice of material(s) for the internal plates 220 may also serve to constrain the lateral expansion of compliant layers 230 (discussed below) disposed adjacent or partially within the internal plates. The thicknesses of the internal plates 220 may be 0.050 inches to 0.300 inches, which and are typically thinner than the compliant layers 230. In another embodiment, the thickness of the internal plates may be in the range of 0.075 inches to 0.250 inches. In yet another embodiment, the thickness may be 0.100 inches to 0.200 inches. In a further embodiment, the thickness may be in the range of 0.115 inches to 0.150 inches. Fixture 200 may be constructed using independent external plates 210 and internal plates 220. In another embodiment, these components may be combined into more complex shaped components, such as a modified external plate with increased thickness and a formed pocket equivalent to the rectangular aperture of internal plates 220.

Compliant layers 230 may also be bonded either to external plates 210 and/or to internal plates 220. Compliant layers 230 serve to prevent lateral flow with respect to internal plates 220 through frictional resistance. This is to provide uniformity of applied pressure, which impacts performance. Durometer, thickness, applied pressure, and plate geometry and material can be adjusted to different cell geometries and applied pressures.

Compliant layers 230 may be positioned within the apertures in internal plates 220 and may also be sized in accordance with cell 260 undergoing storing, handling, use, or testing. Compliant layers 230 may be thicker than internal plates 220 and may facilitate in-plane elastomer flow to compensate for material compression during use and control uniformity of applied pressure. Thicker compliant layers 230 also inhibit inner plates 220 from contacting and damaging the cell. Excess thickness of compliant layers 230 compared to the thickness of inner plates 220 allows for more loss of pressure through the lateral open area not constrained by inner plates 220. If the compliant layers 230 are nearly the same thickness or thinner than inner plates 220, then the pressure distribution may be adversely impacted. Compliant layers 230 may also be contoured to include, for example, a thicker center portion aligning with the inner portion of cell 260 and a thinner peripheral portion aligned with the periphery of cell 260. This contoured compliant layer profile may be used to accommodate the deflection of external plates 210 as they are used to load cell 260. The contouring of compliant layers 230 would allow external plates 210 to deflect while still maintaining an even pressure distribution across the surface of the cell 260. Additionally, or optionally, two compliant layers 230 contoured/tapered shims (not shown), which are generally thicker in the center and thinner at the edges, may be installed between cell 260 and external plates 210 to accommodate external plate deflection.

Compliant layers 230 may be 0.0078 inches to 0.25 inches thicker than internal plates 220. In another embodiment, the compliant layers 230 may be 0.0156 inches to 0.125 inches thicker than the internal plates 220. In yet another embodiment, the compliant players 230 may be 0.03125 inches to 0.0625 inches thicker than the internal plates 220. In FIG. 2, a second compliant layer is hidden from view under lower separator film 250. Compliant layers 230 conform to the nominally planar surface of the external plates 210 as well as the variable surface form of the cell. Compliant layers 230 may be formed of single or multiple layered materials or may be sealed volumes filled with a fluid or gas. The important factors in choosing a material for compliant layers 230 include, but are not limited to, durometer, temperature/heat resistance, and tensile/compression strengths. Materials such as silicone rubbers, Viton rubbers, Buna-N, natural rubber, neoprene, and polyurethane, may be used. In another embodiment, one or more materials or composites containing fibers may be used, such as fiberglass, fabric, natural fiber mesh, and synthetic fiber mesh. Compliant layers 230, for example, may have a durometer in the range of Shore 10A to Shore 90A. In another embodiment, the durometer may be in the range of Shore 20A to Shore 80A. In yet another embodiment, the durometer may be in the range of Shore 30A to Shore 70A. In a further embodiment, the durometer may be in the range of Shore 40A to Shore 60A. In yet a further embodiment, the durometer may be in the range of Shore 45A to Shore 55A. Separator film 250 may be one or more of a polymer-based film and is used to reduce the shear forces due to friction at the interfaces between compliant layers 230 and the surfaces of cell 260. In some embodiments, the separator film may comprise one or more of a polyester, polyethylene, or polyethylene terephthalate material. In another embodiment, the separator film 250 may comprise or one or more of a polyimide film, such but not limited to Apical, Kapton, UPILEX, or Kaptrex. In a further embodiment, the separator film 250 may comprise one or more of a fluoropolymer, such as but not limited to Polytetrafluoroethylene (PTFE), Perfluoroalkoxy alkane (PFA), or Fluorinated Ethylene Propylene (FEP). In yet another embodiment, the separator film 250 may comprise one or more of a fiber-containing material, such as fiberglass or carbon fiber. A suitable separator film 250 may also be used to reduce or eliminate adhesion of the compliant layers 230 to cell 260 upon removal of cell 260 from fixture 200. Alternatively, separator film 250 may be a spray coating or other friction lowering material, such as a silicone mold release agent.

Cell fixture 200 may be assembled, fixed, and loaded using fasteners 240, such as common bolts or screws with nuts 242 and washers 244. Load variation and compliance may be provided by the inclusion of one or more Belleville washers 270 in association with each fastener 240. Belleville washers 270 or other elements may also be used for compensation of thermal expansion of components of fixture 200. Belleville washers 270 are chosen with a non-linear load/deflection curve, such that the effective spring rate, at the desired operating load, is minimized thereby minimizing load variation due to thermal expansion and cell cycling. Multiple washers may be stacked in series on the same fastener to increase available deflection without changing load. Multiple washers may also be stacked in parallel on the same fastener to increase available load without changing deflection and without substantially affecting overall size of fixture 200. Additional elements, such as isolators 280 of a polyimide film such as Apical, Kapton, UPILEX, or Kaptrex or similar, may be used for electrical isolation of cell tabs 265 from elements of cell fixture 200. It is recognized that the number and location of fasteners 240 and accompanying nuts 242 and washers 244, otherwise referred to as fastener sets, may vary from what is depicted in FIG. 2. For example, in an embodiment in which the encompassed cell 260 has a greater length compared to its width, some greater number of fastener sets, such as five, six or seven, may be provided along each long edge of the cell fixture. In addition, if the width of the cell fixture is greater than the length, one or more fastener sets may be provided along each width edge.

Figure 3:
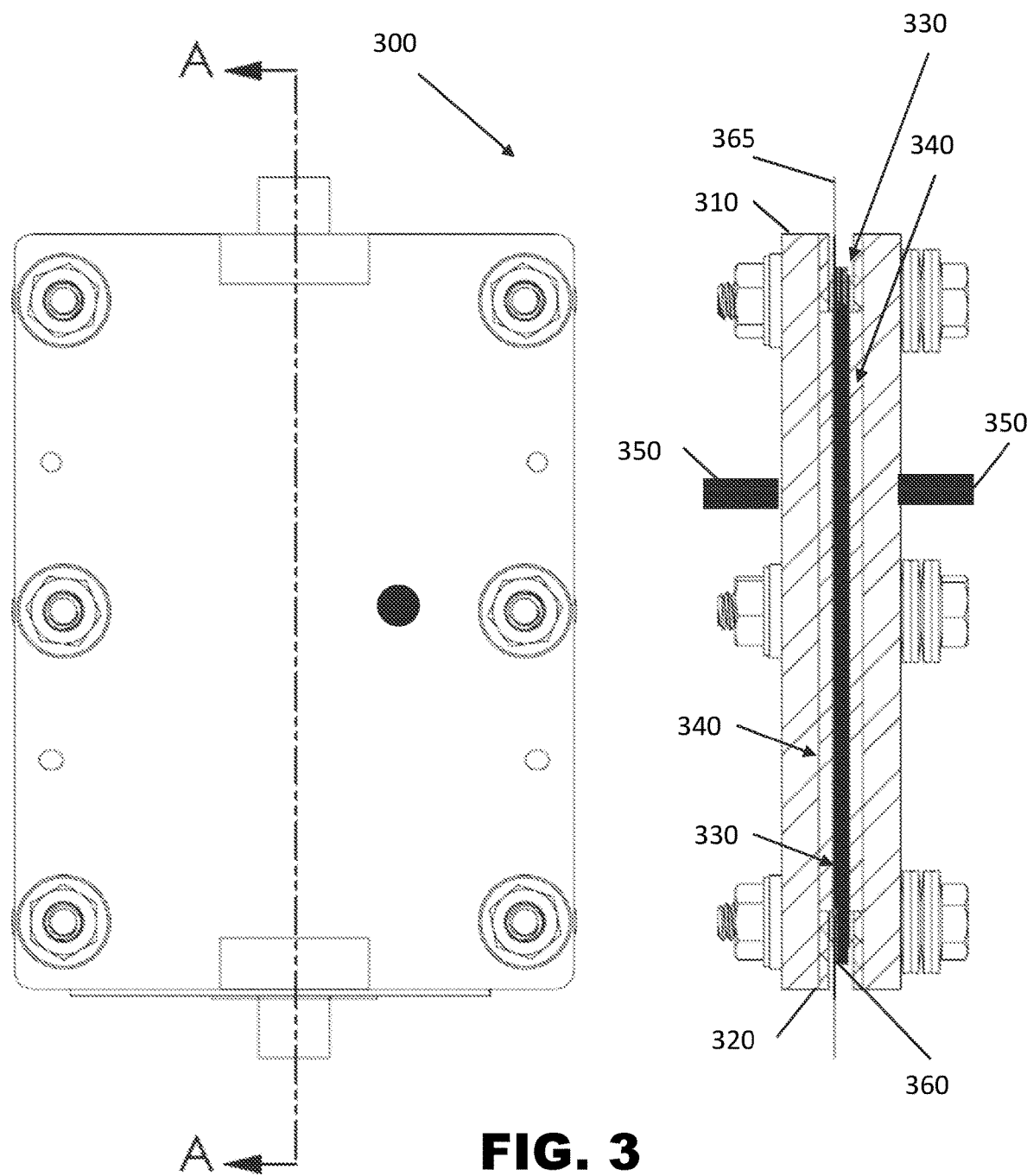
FIG. 3 shows a plan-view and a cross-sectional drawing of an exemplary construction of a battery or electrochemical cell fixture, in accordance with an embodiment.

As shown in a plan-view and a cross-sectional drawing of an exemplary construction of a cell fixture 300 in FIG. 3, in an alternative construction, external plates 310, and internal plates 320, similar to external plates 210 and internal plates 220 of FIG. 2, may be assembled and sealed with membranes 330 to define a sealed volume 340 in each aperture within the internal plates 320. The membrane of the first internal plate is mutually parallel to the sealed membrane of the second internal plate. The sealed volumes defined by these membranes may be filled and pressurized either pneumatically or hydraulically, for example via gas or fluid couplings 350 fixed to external plates 310, located on either side of cell 360, to alter the pressure applied to cell 360, which is sandwiched between the first and second sealed volumes defined, respectively, by the first and second membranes. The sealed volumes 340 defined by the membranes 330 provide the flexibility and compliance otherwise provided by the compliant layers 230 of FIG. 2 and further beneficially permit pressure adjustment either pneumatically or hydraulically rather than via the use of the fasteners and Belleville washer combinations of FIG. 2. Membranes 330 may be formed from a synthetic rubber, such as polychloroprene, Neoprene, Latex, or other expandable rubbers, and bonded to internal plates 320 or to an interior surface of the respective external plate 310 using suitable adhesives or mechanical clamping. Similar to the construction of FIG. 2, external plates 310 support the application of uniform loading to cell 360 by retaining alignment of pressurized sealed volumes 340 to cell 360. Cell tabs 365 remain accessible for external (not shown) connections to test equipment.

EXAMPLES

Pressure distribution measurements were collected by use of a Tekscan Model 5051-500 where cell fixture 200 was assembled such that a pressure detector with a sensor matrix of 2.2"×2.2" or 4.84 square inches replacing cell 260 in cell fixture 200 of FIG. 2. Specifically, the pressure detector was placed on top of the separator film 250 and under the compliant layer 230. The cell fixture was assembled such that an average pressure in lbs was applied to the pressure detector. In these examples, "Pressure Applied" is the target pressure to apply over the whole area of the cell. The Tekscan sensor used can only capture a small section of the entire cell area. This results in the sensor reading a smaller area compared to the whole cell while having the same amount of force applied increasing the final value of the "Average Pressure Detected". The pressure sensor then recorded the Standard Deviation and Percent (%) Standard Deviation of the applied pressure across the surface of the sensor.

| Sample | Durometer of interlayer | Average Pressure Detected (lbs) | Standard Deviation (lbs) | % Standard Deviation |
|---|---|---|---|---|
| Example 1 | 40A | 245.13 | 108.85 | 44.40% |
| Example 2 | 40A | 322.31 | 120.34 | 37.34% |
| Example 3 | 40A | 404.00 | 139.95 | 34.64% |
| Example 4 | 50A | 238.56 | 80.53 | 33.76% |

-continued

| Sample | Durometer of interlayer | Average Pressure Detected (lbs) | Standard Deviation (lbs) | % Standard Deviation |
|---|---|---|---|---|
| Example 5 | 50A | 325.73 | 92.06 | 28.26% |
| Example 6 | 50A | 375.42 | 101.73 | 27.10% |
| Example 7 | 60A | 212.77 | 73.23 | 34.42% |
| Example 8 | 60A | 320.84 | 88.70 | 27.65% |
| Example 9 | 60A | 525.17 | 159.15 | 30.30% |
| Example 10 | 70A | 218.87 | 109.28 | 49.93% |
| Example 11 | 70A | 296.60 | 102.81 | 34.66% |
| Example 12 | 70A | 342.38 | 115.58 | 33.76% |
| Example 13 | 50A | 389.69 | 91.01 | 23.36% |
| Counter Example 1 | N/A | 89.98 | 92.00 | 102.24% |
| Counter Example 2 | N/A | 178.73 | 173.30 | 96.96% |

Example 1

The cell fixture was assembled, such that the external plates 210 were made of A36 low carbon steel and had a thickness of 0.24 inches. The internal plate 220 were made of A36 low carbon steel and had a thickness of 0.0625 inches. The compliant layer 230 was made of silicon rubber with a durometer of 40A and a thickness of 0.0937 inches. The separator film 250 was made of polyester and had a thickness of 3 mm. When fully assembled, average pressure applied to the pressure detector was 245.13 lbs, the standard deviation of said pressure was 108.85 lbs, and the percent standard deviation was 44.40%.

Example 2

This example was conducted in the same manner as Example 1 with the differences being when fully assembled, the average pressure applied to the pressure detector was 322.31 lbs, the standard deviation of said pressure was 120.34 lbs, and the percent standard deviation was 37.34%.

Example 3

This example was conducted in the same manner as Example 1 with the differences being when fully assembled, the average pressure applied to the pressure detector was 404.00 lbs, the standard deviation of said pressure was 139.95 lbs, and the percent standard deviation was 34.64%.

Example 4

This example was conducted in the same manner as Example 1 with the differences being the durometer of the compliant layer 230 was 50A and when fully assembled, the average pressure applied to the pressure detector was 238.56 lbs, the standard deviation of said pressure was 80.53 lbs, and the percent standard deviation was 33.76%.

Example 5

This example was conducted in the same manner as Example 1 with the differences being the durometer of the compliant layer 230 was 50A and when fully assembled, the average pressure applied to the pressure detector was 325.73 lbs, the standard deviation of said pressure was 92.06 lbs, and the percent standard deviation was 28.26%.

Example 6

This example was conducted in the same manner as Example 1 with the differences being the durometer of the compliant layer 230 was 50A and when fully assembled, the average pressure applied to the pressure detector was 375.42 lbs, the standard deviation of said pressure was 101.73 lbs, and the percent standard deviation was 27.10%.

Example 7

This example was conducted in the same manner as Example 1 with the differences being the durometer of the compliant layer 230 was 60A and when fully assembled, the average pressure applied to the pressure detector was 212.77 lbs, the standard deviation of said pressure was 73.23 lbs, and the percent standard deviation was 34.42%.

Example 8

This example was conducted in the same manner as Example 1 with the differences being the durometer of the compliant layer 230 was 60A and when fully assembled, the average pressure applied to the pressure detector was 320.84 lbs, the standard deviation of said pressure was 88.70 lbs, and the percent standard deviation was 27.65%.

Example 9

This example was conducted in the same manner as Example 1 with the differences being the durometer of the compliant layer 230 was 60A and when fully assembled, the average pressure applied to the pressure detector was 525.17 lbs, the standard deviation of said pressure was 159.15 lbs, and the percent standard deviation was 30.30%.

Example 10

This example was conducted in the same manner as Example 1 with the differences being the durometer of the compliant layer 230 was 70A and when fully assembled, the average pressure applied to the pressure detector was 218.87 lbs, the standard deviation of said pressure was 109.28 lbs, and the percent standard deviation was 49.93%.

Example 11

This example was conducted in the same manner as Example 1 with the differences being the durometer of the compliant layer 230 was 70A and when fully assembled, the average pressure applied to the pressure detector was 296.60 lbs, the standard deviation of said pressure was 102.81 lbs, and the percent standard deviation was 34.66%.

Example 12

This example was conducted in the same manner as Example 1 with the differences being the durometer of the compliant layer 230 was 70A and when fully assembled, the average pressure applied to the pressure detector was 342.38 lbs, the standard deviation of said pressure was 115.58 lbs, and the percent standard deviation was 33.76%.

Example 13

This example was conducted in the same manner as Example 1 with the differences being the durometer of the compliant layer 230 was 50A, the separator film 250 was a made of fiberglass and had a thickness of 0.03125 inches, and when fully assembled, the average pressure applied to the pressure detector was 389.69 lbs, the standard deviation of said pressure was 91.01 lbs, and the percent standard deviation was 23.36%

Comparative Example 1

For comparative examples, the pressure distribution measurements were collected by use of a Tekscan Model 5051-500 where a pressure detector with a sensor matrix of 2.2"×2.2" or 4.84 square inches would take the place of cell 260 in cell fixture 200 in FIG. 2. However, cell fixture 200 of FIG. 2 was assembled without the internal plate 220, the compliant layer 230, or the separator film 250. This resulted in the pressure sensor coming in direct contact with the external plates 210 which exerted an average pressure to the pressure detector. The pressure sensor then recorded the standard deviation and percent standard deviation of the applied pressure across the surface of the sensor. When fully assembled, the average pressure applied to the pressure detector was 89.98 lbs, the standard deviation of said pressure was 92.00 lbs, and the percent standard deviation was 102.24%.

Comparative Example 2

This example was conducted in the same manner as Comparative Example 1 with the differences being when fully assembled, the average pressure applied to the pressure detector was 178.73 lbs, the standard deviation of said pressure was 173.30 lbs, and the percent standard deviation was 96.96%

Summary of Results

According to the table provided, the Percent (%) Standard Deviation of Examples 1-13 are lower than in Comparative Examples 1 and 2. Therefore, the disclosed device that incorporates the internal plate 210, the compliant layer 230, and the separator film 250 into the cell fixture 200 allows for superior pressure distribution over a desired area as compared to a cell fixture devoid of said features.

What is claimed is:

1. An electrochemical cell or battery pressure application device, comprising:
   first and second external plates;
   a first internal plate adjacent to the first external plate, and comprising a first external dimension and a first internal dimension defining a first aperture corresponding to an exterior dimension of an electrochemical cell or battery;
   a second internal plate adjacent to the second external plate, and comprising a second external dimension and a second internal dimension defining a second aperture corresponding to the exterior dimension of the electrochemical cell or battery;
   a first compliant layer adjacent to the first internal plate, the first compliant layer comprising a thicker center portion positioned within the first aperture of the first internal plate and a thinner peripheral portion aligning with a peripheral portion of the electrochemical cell or battery, wherein the thicker portion comprises dimensions less than the first internal dimension of the first internal plate and the thinner peripheral portion comprises dimensions more than the first internal dimension of the first internal plate, the thicker portion held within the first aperture of the first internal plate and the thinner peripheral portion adjacent the first internal plate outside of the first aperture; and
   a plurality of fastener sets for applying an adjustable pressure to the electrochemical cell or battery positioned between the first and second internal plates.

2. The electrochemical cell or battery pressure application device of claim 1, wherein the first and second internal plates have the same external dimensions.

3. The electrochemical cell or battery pressure application device of claim 2, wherein the respective apertures of the first and second internal plates have the same dimensions.

4. The electrochemical cell or battery pressure application device of claim 1, wherein the first and second external plates have the same external dimensions.

5. The electrochemical cell or battery pressure application device of claim 1, wherein a thickness of the first and second external plates comprises approximately 0.075 to 0.4 inches.

6. The electrochemical cell or battery pressure application device of claim 1, wherein a thickness of the first and second internal plates comprises approximately 0.05 to 0.300 inches.

7. The electrochemical cell or battery pressure application device of claim 1, further comprising:
   a second compliant layer adjacent to the second internal plate.

8. The electrochemical cell or battery pressure application device of claim 7, wherein each of the first and second compliant layers are approximately 0.0078 to 0.25 inches thicker than the respective one of the first and second internal plates.

9. The electrochemical cell or battery pressure application device of claim 7, further comprising:
   a first separator film on a surface of the first compliant layer; and
   a second separator film on a surface of the second compliant layer.

10. The electrochemical cell or battery pressure application device of claim 9, wherein each of the first and second separator films comprises a polymer-based film.

11. The electrochemical cell or battery pressure application device of claim 9, further comprising a mold release spray coating on each of the first and second separator films opposite the respective one of the first and second compliant layers.

12. The electrochemical cell or battery pressure application device of claim 7, wherein each of the first and second compliant layers is comprised of one or more materials selected from a group consisting of silicone rubbers, Viton rubbers, Buna-N, natural rubber, neoprene, and polyurethane.

13. The electrochemical cell or battery pressure application device of claim 7, wherein each of the first and second compliant layers has a durometer in a range of Shore 10A to Shore 90A.

14. The electrochemical cell or battery pressure application device of claim 7, wherein:
   the second compliant layer comprises at least a first portion that is dimensioned to be received within the second aperture.

15. The electrochemical cell or battery pressure application device of claim 7, wherein the second compliant layer comprises a thicker center portion aligning with the second aperture of the second internal plate, and a thinner peripheral portion aligning with a peripheral portion of the electrochemical cell or battery.

16. The electrochemical cell or battery pressure application device of claim 7, wherein:

the first compliant layer comprises a first membrane forming a first sealed volume and disposed within the aperture of the first internal plate; and the second compliant layer comprises a second membrane forming a second sealed volume and disposed within the aperture of the second internal plate.

17. The electrochemical cell or battery pressure application device of claim 16, wherein the first and second external plates further comprise couplings through the external plates in communication with a respective one of the first and second membranes for filling the respective one of the first and second membranes to adjust the pressure within the respective sealed volume.

18. The electrochemical cell or battery pressure application device of claim 1, wherein:

the first and second external plates and first and second internal plates each have a plurality of mutually aligned apertures; and wherein each of the fastener sets comprises a threaded fastener disposable with a respective one of the mutually aligned apertures, a threaded nut receivable by the threaded fastener, and at least one washer disposable intermediate the respective threaded fastener and the respective threaded nut.

19. The electrochemical cell or battery pressure application device of claim 1, wherein the first external plate comprises a curved central region curving toward the first internal plate adjacent to the first external plate.

20. The electrochemical cell or battery pressure application device of claim 1, wherein the second external plate comprises a curved central region curving toward the second internal plate adjacent to the second external plate.

* * * * *